(12) United States Patent
Angrish et al.

(10) Patent No.: US 9,330,149 B2
(45) Date of Patent: May 3, 2016

(54) TECHNIQUES FOR QUERY AND DML OVER RELATIONAL TABLES USING SPREADSHEET APPLICATIONS

(75) Inventors: Rohan Angrish, Redwood City, CA (US); James W. Warner, South San Francisco, CA (US); Zhen Hua Liu, San Mateo, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1824 days.

(21) Appl. No.: 11/959,398

(22) Filed: Dec. 18, 2007

(65) Prior Publication Data

US 2009/0158251 A1  Jun. 18, 2009

(51) Int. Cl.
G06F 17/30  (2006.01)

(52) U.S. Cl.
CPC .... *G06F 17/30569* (2013.01); *G06F 17/30914* (2013.01)

(58) Field of Classification Search
None
See application file for complete search history.

(56) References Cited

U.S. PATENT DOCUMENTS

| | | | |
|---|---|---|---|
| 5,787,449 A | 7/1998 | Vulpe et al. | |
| 2002/0156772 A1 | 10/2002 | Chau et al. | |
| 2002/0184260 A1* | 12/2002 | Martin et al. | 707/503 |
| 2003/0140308 A1 | 7/2003 | Murthy et al. | |
| 2004/0181679 A1 | 9/2004 | Dettinger et al. | |
| 2005/0021548 A1* | 1/2005 | Bohannon et al. | 707/101 |
| 2005/0108283 A1 | 5/2005 | Karimisetty et al. | |
| 2005/0172217 A1* | 8/2005 | Leung | 715/503 |
| 2005/0187969 A1 | 8/2005 | Chaudri | |
| 2005/0268215 A1* | 12/2005 | Battagin et al. | 715/503 |
| 2006/0036612 A1 | 2/2006 | Harrop et al. | |
| 2006/0230075 A1 | 10/2006 | Greef et al. | |
| 2008/0016041 A1* | 1/2008 | Frost et al. | 707/3 |
| 2008/0028288 A1* | 1/2008 | Vayssiere et al. | 715/219 |
| 2009/0012974 A1* | 1/2009 | Cassidy | 707/100 |
| 2011/0060767 A1 | 3/2011 | Agarwal et al. | |

OTHER PUBLICATIONS

Article entitled "Triggers over XML Views of Relational Data", dated 2005, by Shao et al.*
Article entitled "Top 10 reasons to use Access with Excel" by Microsoft, Copyright 2012.*
Article entitled "About importing data" by Microsoft, Copyright 2012.*
Article entitled "Viewing an XML file in Excel" by Microsoft, dated 2002.*

(Continued)

*Primary Examiner* — Mahesh Dwivedi
(74) *Attorney, Agent, or Firm* — Hickman Palermo Becker Bingham LLP; Marcel K. Bingham

(57) ABSTRACT

In one embodiment, a database server receives a request from a spreadsheet application to open a file with spreadsheet data. The spreadsheet data is stored in one or more relational tables in one or more relational databases that are managed by the database server. In response to the request, the database server generates the file, where generating the file comprises retrieving the spreadsheet data from an XML view that is defined by an XQuery query. When executed, the XQuery query returns the spreadsheet data in an XML spreadsheet format that is understood by the spreadsheet application. The database server provides the generated file with the spreadsheet data directly to the spreadsheet application, where the spreadsheet data as retrieved from the XML view is formatted according to the XML spreadsheet format.

26 Claims, 9 Drawing Sheets

(56) References Cited

OTHER PUBLICATIONS

Book entitled "Excel PivotTables and PivotCharts", Published on Nov. 5, 2007 by McFedries.*

Oracle® Application Server Portal, User's Guide, 10g Release 2 (10.1.4), Chapter 19 "Using WebDAV Clients with OracleAS Portal", Document No. B13809-04, Oracle Technology Network, published Sep. 2005, 34 pages.

Oracle® Call Interface, Programmer's Guide, 10g Release 2 (10.2), Chapter 4 "Using SQL Statements in OCI", Document No. B14250-02, Oracle Technology Network, published Nov. 2005, 17 pages.

U.S. Appl. No. 12/555,252, filed Sep. 8, 2009, Office Action, Sep. 19, 2011.

U.S. Appl. No. 12/555,252, filed Sep. 8, 2009, Final Office Action, Apr. 12, 2012.

* cited by examiner

Fig. 3A

```
<xsl:stylesheet xmlns:xsl="http://www.w3.org/TR/WD-xsl">
<xsl:pi name="xml">version="1.0"</xsl:pi>
<Row ss:Height="14.25">
    <Cell ss:Style="locked">
        <Data ss:Type="String">...</Data>
    </Cell>
    <Cell><Data ss:Type="Number">...</Data></Cell>
    <Cell ss:Formula="=RC[-3]*RC[-2]*1*(1-RC[-1])">
        <Data ss:Type="Number">...</Data>
    </Cell>
    ...
</Row>
<Row>
    ...
</Row>
...
```

302 →
304 — Row ss:Height
308 — Cell ss:Style="locked"
306 — Cell ss:Formula

```
for each row in the received spreadsheet {         ← 312
    determine whether the current row is new
    if the current row is newly added in the received spreadsheet {    ⎫
        insert the values from the cells of the current row            ⎬ 314
                 into the underlying relational table(s)               ⎭
    }
    else {                                          ← 318
        for each cell in the current row {
            determine whether the value in the current cell has been changed   ⎫
            if the value in the current cell has been changed {                ⎬ 320
                update the row and column of the underlying
                    relational table with the value in the current cell        ⎭
        }
    } ← 316
}
```

TECHNIQUES FOR QUERY AND DML OVER RELATIONAL TABLES USING SPREADSHEET APPLICATIONS

FIELD OF THE INVENTION

The present invention relates to querying and modifying relational tables using spreadsheet applications.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Presently, commercial spreadsheet applications like Microsoft® Excel and Open Office Calc cannot directly access and modify data that is stored in databases managed by a database server. One reason for this is that spreadsheet applications typically access spreadsheet data that is stored as files, while databases typically store data in non-file formats such as tables and other persistent database objects. Another reason is that it is not a trivial task to convert data stored in a database into data that can be rendered as a spreadsheet by a spreadsheet application.

To allow spreadsheet applications to access data stored in databases, past approaches invariably use some kind of intermediate, non-database server components that convert, translate, re-format, and/or otherwise process data from a database into spreadsheet data that can be rendered as a grid of cells by a spreadsheet application.

For example, some past approaches provide for data drivers that execute outside of a database server and that provide the functionalities that allow a spreadsheet application to retrieve data from, and store data in, a database managed by a database server. These functionalities may include data type conversions, translations, and re-formatting of data that is exchanged between the spreadsheet application and the database server managing the database. For example, a data driver would typically open a cursor with the data requested by a spreadsheet application, and would then process the cursor row-by-row and field-by-field by performing various operations to convert, translate, and/or reformat the data from the cursor into a form or format that is understood by the spreadsheet application. In order to modify data stored in a database managed by a database server, a data driver would similarly open a cursor at the database server and would then process any data changes against the data in the cursor. Examples of such data drivers are Java Database Connectivity (JDBC) drivers and Open Database Connectivity (ODBC) drivers.

The main disadvantage of these past approaches is that they add an additional, intermediate level of data processing that is performed outside of the database server that manages the data accessed and modified by a spreadsheet application. The additional, intermediate level of data processing increases user response times and is costly in terms of the computing resources used. In addition, since the intermediate level of data processing is performed outside of the database server, it cannot take advantage of various optimizations that the database server may otherwise provide for processing data stored in various databases managed by the database server.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A is a block diagram that illustrates spreadsheet data in an example XML spreadsheet format;

FIG. 3B is a block diagram that illustrates pseudo code for an XML view trigger according to one embodiment;

DETAILED DESCRIPTION

Figure 1A:
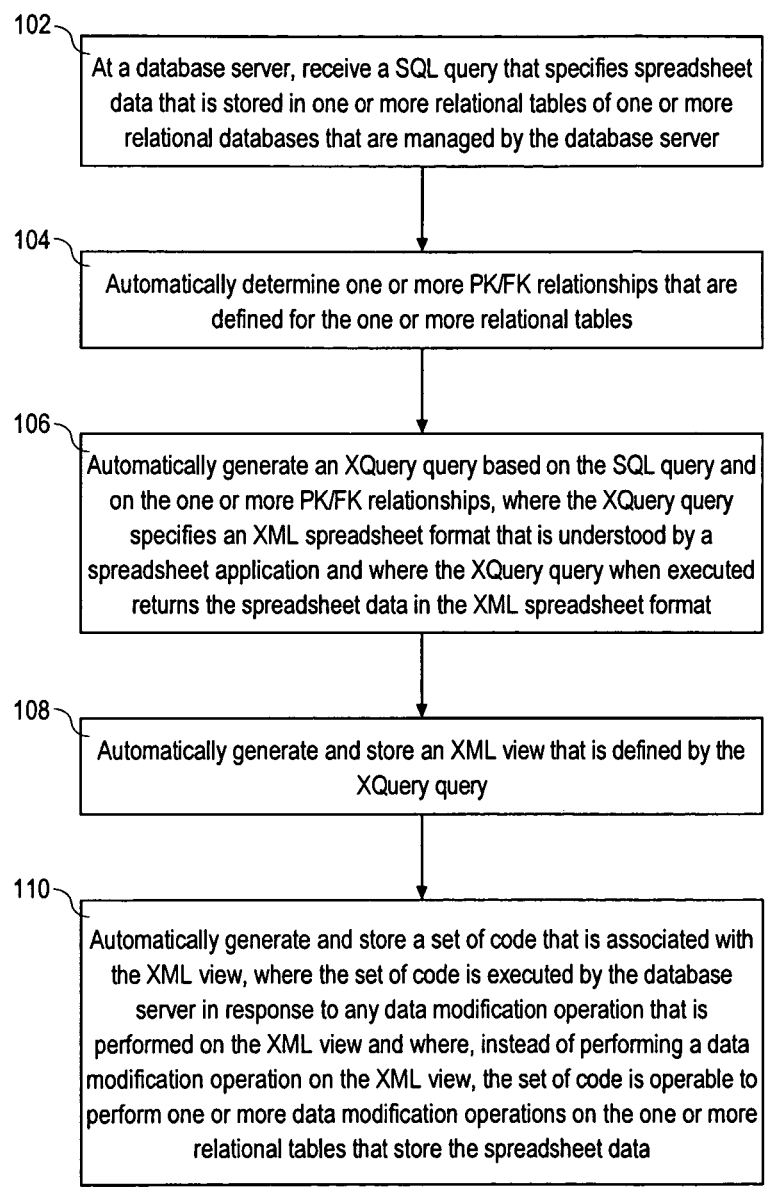
FIG. 1A is a flow diagram that illustrates a method for generating an XML view and an associated set of code according to one embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Techniques are described herein for querying and modifying relational tables using spreadsheet applications. As used herein, "spreadsheet application" refers to an unmodified, commercially available application that is operable to render and process data as a spreadsheet comprising a grid of cells. Examples of spreadsheet applications include, but are not limited to, Microsoft® Excel and Open Office Calc. The techniques described herein may be implemented without limitation for any spreadsheet application that is operable to store and process spreadsheet data in an XML spreadsheet format.

As used herein, "spreadsheet data" refers to any set of data that can be rendered by a spreadsheet application as a spreadsheet comprising a grid of cells. "XML spreadsheet format" refers to a specification that uses eXtensible Markup Language (XML) to define a spreadsheet. For example, an XML spreadsheet format may define a set of tags for representing rows and cells as well as any row/cell properties such as, for example, formulas associated with rows/cells, data types associated with rows/cells, fonts associated with rows/cells, etc. One example of such XML spreadsheet format is the format specification defined by the XMLSS schema provided by Microsoft Corporation.

I. Overview

According to the techniques described herein, a spreadsheet application can directly access and modify spreadsheet data that is stored in a relational database managed by a database server. In this context, "directly" means at least that: (1) the database server can provide spreadsheet data in a format that is understood, and can be rendered, by the spreadsheet application; and (2) the spreadsheet application can provide spreadsheet data in a format that is understood, and can be processed, by the database server. Thus, "directly" means that a spreadsheet application can access and render spreadsheet data that is stored in a relational database without the help of any intermediate, non-database server components that transform, translate, convert, reformat, or otherwise process the spreadsheet data exchanged between the spreadsheet application and the database server. Examples of such intermediate components that are not part of a database server include, without limitation, ODBC drivers, JDBC drivers, and various other types of intermediate modules that facilitate access to data managed by a database server.

In one embodiment, a database server receives a request from a spreadsheet application to open a file with spreadsheet data. The spreadsheet data is stored in one or more relational tables in one or more relational databases that are managed by the database server. In response to the request, the database server generates the file, where generating the file comprises retrieving the spreadsheet data from an XML view that is defined by an XML Query Language (XQuery) query. When executed, the XQuery query returns the spreadsheet data in an XML spreadsheet format that is understood by the spreadsheet application. The database server provides the generated file with the spreadsheet data directly to the spreadsheet application, where the spreadsheet data as retrieved from the XML view is formatted according to the XML spreadsheet format.

II. Functional Description of an Example Embodiment

Generating XML Views for Spreadsheet Data

FIG. 1A is a flow diagram that illustrates a method for generating an XML view and an associated set of code according to one embodiment.

In step 102, a database server receives a Structured Query Language (SQL) query that specifies spreadsheet data that is stored in one or more relational tables in one or more relational databases that are managed by the database server. The database server may receive the SQL query through various mechanisms including, but not limited to, a command-line user interface, a graphical user interface, and various program applications that are operable to connect and submit requests to the database server.

In different embodiments, the spreadsheet data may be specified to the database server in the form of requests and/or information that are different from a SQL query. For example, in some embodiments the database server may receive an XQuery query that specifies the spreadsheet data which is stored in one or more relational tables managed by the database server. In other embodiments, the database server may receive a list of information that identifies the tables and columns which store the spreadsheet data of interest. An example of such list of information may be "((EMP, DEPT), (EMP.EMPNO, EMP.NAME, DEPT.LOCATION))", where "EMP" and "DEPT" are the names of relational tables, "EMPNO" and "NAME" are columns of the "EMP" table, and "LOCATION" is a column of the "DEPT" table. Thus, the use of a SQL query to specify spreadsheet data to a database server as described herein is to be regarded in an illustrative rather than a restrictive sense.

As used herein, "database server" refers to a set of integrated software components which, when executed, may be allocated computational resources, such as memory, CPU time, and storage space for providing database management functions on behalf of clients of the server. Among other functions of database management, a database server governs and facilitates access to one or more databases, creates and manages database objects for storing data in the databases, stores data in the databases, and processes requests and queries by clients to access the databases and the database objects therein. In various architectures, a database server may be implemented as single server instance or as a cluster of multiple server instances.

In step 104, the database server automatically determines one or more primary key (PK)/foreign key (FK) relationships that are defined for the one or more relational tables. For example, the database server may examine one or more database dictionaries that store metadata information about the one or more relational tables. Based on the metadata information, the database server determines any primary keys and foreign keys that are defined for the one or more relational tables and any PK/FK relationships that exist therefor.

In step 106, the database server automatically generates an XQuery query based on the SQL query and on the one or more PK/FK relationships. The XQuery query specifies an XML spreadsheet format that is understood by a spreadsheet application. The generated XQuery query is such that when executed, it returns in the XML spreadsheet format the spreadsheet data that is specified in the received SQL query.

In step 108, the database server automatically generates and stores an XML view that is defined by the XQuery query.

As used herein, a "view" refers to a database object that is defined by a query which when executed returns a set of data. An "XML view" refers to a view that is defined by a query, such as for example an XQuery query, which when executed returns data that conforms to an XML format. Typically, a view is created by executing a data definition language (DDL) statement at a database server, where the DDL statement specifies a query that defines the view. The query defining the view specifies one or more columns that are mapped to one or more columns of one or more tables or other views; the query defining the view may also specify one or more predicates that determine the rows of data from the one or more tables or other views that would be returned when the query is executed. When a data manipulation language (DML) statement or other database command requests data from a view, the query that defines the view is executed to return the requested data. Views may be referenced in database commands and DML statements that conform to a query language (e.g., SQL, XQuery), and may be treated by a database server as references to tables.

In step 110, the database server automatically generates and stores a set of code that is associated with the XML view. The set of code is such that it is executed by the database server in response to any data modification operation that is performed on the XML view. According to the techniques described herein, instead of performing a data modification operation on the XML view, the set of code performs one or more data modification operations on the one or more relational tables that are referenced in the XML view. An example of such set of code is an Instead-Of trigger that is associated with the XML view. It is noted however, that the techniques described herein are not limited to Instead-Of triggers or to any other type of triggers; rather the techniques described herein may be implemented through any type of code, function, or procedure that can be executed by the database server instead of a data modification operation on an XML view. Thus an Instead-Of trigger, which is provided throughout the present disclosure as an example of the set of code utilized by the techniques described herein, is to be regarded in an illustrative rather than a restrictive sense.

Accessing Spreadsheet Data Through XML Views

Figure 1B:
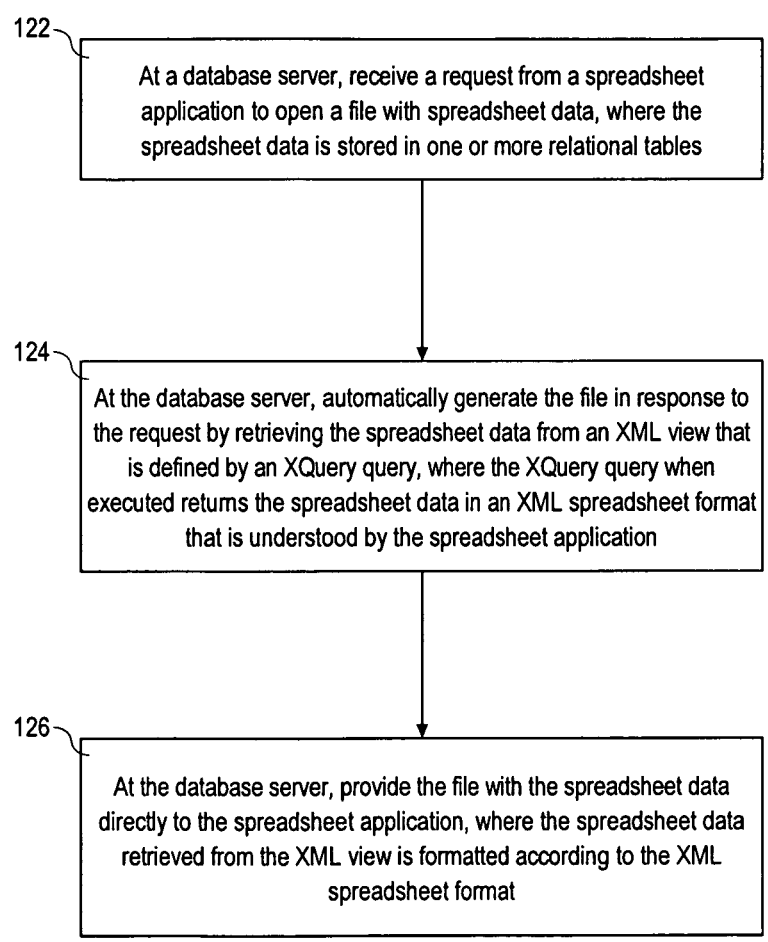
FIG. 1B is a flow diagram that illustrates a method for accessing spreadsheet data through an XML view according to one embodiment.

FIG. 1B is a flow diagram that illustrates a method for accessing spreadsheet data through an XML view according to one embodiment.

In step 122, a database server receives a request from a spreadsheet application to open a file with spreadsheet data, where the spreadsheet data is stored in one or more relational tables. The database server may receive the request from the spreadsheet application through a file protocol interface, which is provided by the database server to expose database resources as files that can be accessed through various applications. For example, the request may include a command to open a file and a filename for the file that are specified to the spreadsheet application by a user.

In response to receiving the request from the spreadsheet application, in step 124 the database server automatically generates the requested file by retrieving the requested spreadsheet data from an XML view that is defined by an XQuery query. When executed, the XQuery query returns the spreadsheet data in an XML spreadsheet format that is understood by the spreadsheet application. For example, based on a filename included in the request from the spreadsheet application, a file protocol interface of the database server may determine that the spreadsheet application is requesting a file with spreadsheet data that can be retrieved from a particular XML view that is registered by the file protocol interface in association with the filename. After determining the particular XML view which can be used to retrieve the requested spreadsheet data, the file protocol interface or another component of the database server executes a statement (e.g., a SQL SELECT statement) against the particular XML view to retrieve the spreadsheet data. The spreadsheet data retrieved from the XML view is formatted in an XML spreadsheet format that is understood by the spreadsheet application because the particular XML view is defined by an XQuery query that returns spreadsheet data in the XML spreadsheet format. The retrieved spreadsheet data in the XML spreadsheet format is then converted in file format by the file protocol interface of the database server.

In step 126, the database server provides directly to the spreadsheet application the generated file with the spreadsheet data in the XML spreadsheet format. For example, in response to the request from the spreadsheet application, the file protocol interface of the database server may return the generated file to the spreadsheet application.

It is noted that the techniques for accessing spreadsheet data through an XML view described herein are completely transparent from the perspective of the spreadsheet application. For example, the spreadsheet application sends a request for, and receives, a file with spreadsheet data without knowing that the data is actually stored in relational database tables managed by a database server and without needing to do anything outside of performing its normal operations for opening a file. Specifically, in contrast to prior approaches, the spreadsheet application does not need to use an intermediate data driver to access the spreadsheet data because the database server provides the spreadsheet data to the spreadsheet application in an XML spreadsheet format that is understood, and can be directly rendered as a spreadsheet, by the spreadsheet application.

Modifying Relational Data via Spreadsheets by Using XML Views

Figure 1C:
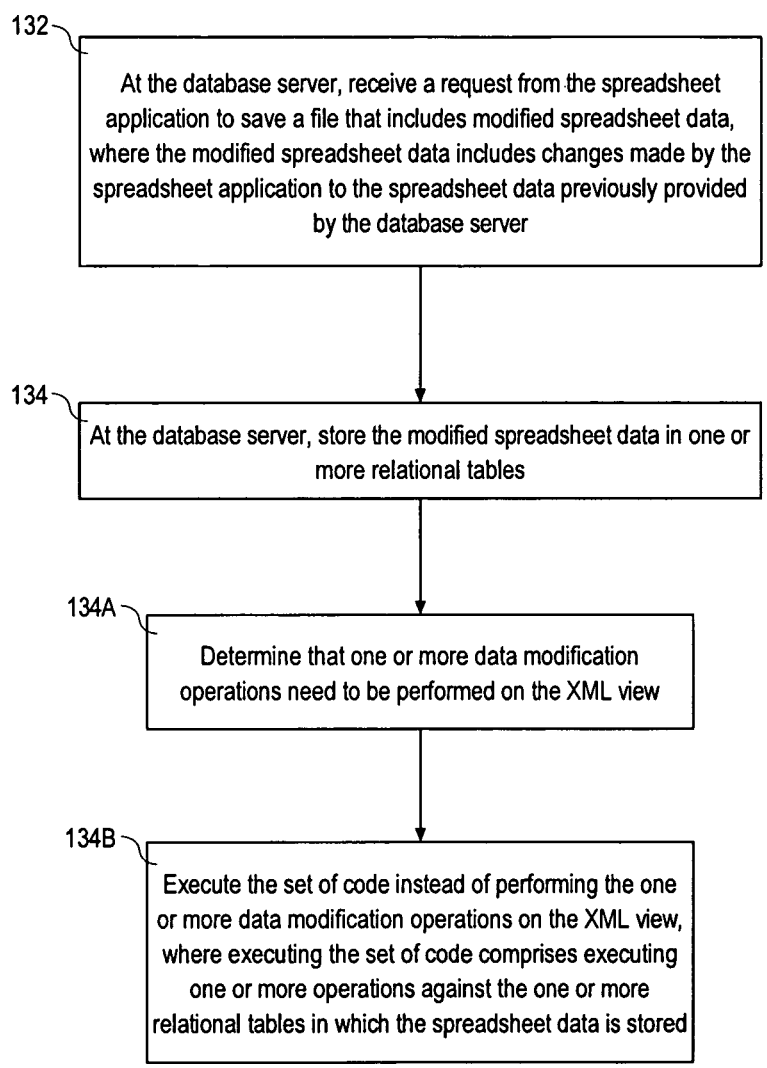
FIG. 1C is a flow diagram that illustrates a method for modifying relational data via spreadsheets by using an XML view according to one embodiment.

FIG. 1C is a flow diagram that illustrates a method for modifying relational data via spreadsheets by using an XML view according to one embodiment.

In step 132, the database server receives a request from a spreadsheet application to save a file that includes modified spreadsheet data. The modified spreadsheet data includes changes made by the spreadsheet application to spreadsheet data, which spreadsheet data was previously retrieved by the database server from an XML view and was provided to the spreadsheet application.

For example, the request from the spreadsheet application may be received by a file protocol interface of the database server. The request may include a command to save a file and a filename for the file that includes the modified spreadsheet data. Based on the filename included in the request, the file protocol interface of the database server may determine that the spreadsheet application is requesting to save spreadsheet data that can be retrieved from a particular XML view that is registered by the file protocol interface in association with that filename. After determining the particular XML view, the file protocol interface of the database server may convert the command to save the file with the modified spreadsheet data into one or more data modification operations against the particular XML view.

In step 134, the database server stores into one or more relational tables the modified spreadsheet data that is received in the file sent from the spreadsheet application. For example, after the file protocol interface of the database server has converted the command to save the file into one or more data modification operations against the particular XML view, the database server executes the one or more data modification operations against the XML view.

Storing the modified spreadsheet data in the one or more relational tables comprises the database server performing steps 134A and 134B. In step 134A, the database server determines that one or more data modification operations have been executed against an XML view. In response to the execution of the one or more data modification operations, in step 134B the set of code associated with the XML view is executed instead of the one or more data modification operations. When executed, the set of code associated with the XML view converts the one or more data modification operations into one or more sets of operations against the one or more relational tables that store the spreadsheet data accessible through the XML view. Thereafter, the set of code executes the one or more sets of operations against the one or more relational tables to store the modified spreadsheet data.

For example, the database server executes one or more data modification operations against a particular XML view after the file protocol interface of the database server has converted a command received from a spreadsheet application to save a file with the modified spreadsheet data. In response to the execution of the one or more data modification commands, an Instead-Of trigger associated with the particular XML view is fired and executed. When executed, the Instead-Of trigger determines the operations that need to be executed against the one or more relational tables underlying the particular XML view, and executes these operations to store the modified spreadsheet data in the one or more relational tables.

It is noted that the techniques for modifying spreadsheet data through an XML view described herein are completely transparent from the perspective of the spreadsheet application. For example, the spreadsheet application saves a file with spreadsheet data without knowing that the data is actually stored in relational database tables managed by a database server and without needing to do anything outside of performing its normal operations for saving a file. Specifically, in contrast to prior approaches, the spreadsheet application does not need to use an intermediate data driver to facilitate the storing of the spreadsheet data in a database managed by a database server. This is because the database server is capable of receiving the spreadsheet data in an XML spreadsheet format from the spreadsheet application, and of executing data modification operations against an XML view to store the spreadsheet data, where executing the data modification operations causes the execution of a set of code associated with the XML view that stores the spreadsheet data in the relational tables underlying that XML view.

III. Structural Description of an Example Embodiment

Figure 2:
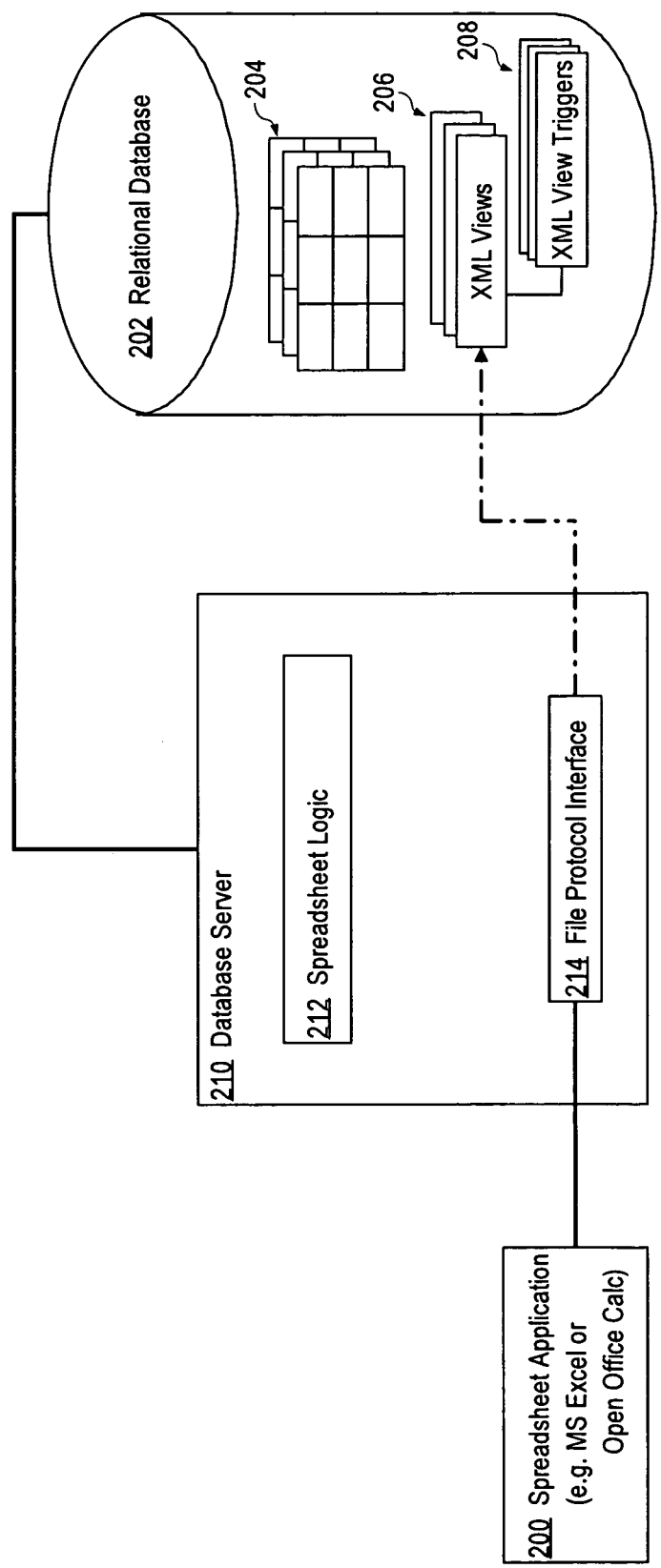
FIG. 2 is a block diagram that illustrates an example operational context according to one embodiment.

FIG. 2 is a block diagram that illustrates an example operational context according to one embodiment.

Spreadsheet application 200 is capable of communicatively connecting to database server 210, which manages one or more relational databases such as relational database 202. Spreadsheet application 200 is an unmodified, commercially available application that can render and process data as a spreadsheet comprising a grid of cells, such as for example Microsoft® Excel and Open Office Calc. The techniques described herein may be implemented without limitation for any spreadsheet application that can store and process spreadsheet data in an XML spreadsheet format.

Database 202 is a relational database that stores data in various relational data objects including, but not limited to, relational tables, views, and materialized views. In addition, database 202 may store various other objects including, but not limited to, indexes, triggers, functions (user-defined and/or system), and stored procedures (user-defined and/or system). Database 202 may also store metadata information associated with database users and the permissions the database users are granted to the various objects maintained in the database.

According to the techniques described herein, database server 210 comprises spreadsheet logic 212 and file protocol interface 214.

Spreadsheet logic 212 is a set of database server components which, when executed, are operable to receive various query statements and other database commands that define spreadsheet data that is stored in one or more relational tables 204 of database 202. For example, spreadsheet logic 212 may be implemented as an Application Programming Interface (API) which is operable to receive SQL queries and other statements that conform to a query language such as SQL and XQuery. In various embodiments, spreadsheet logic 212 may be implemented as one or more database server components that can receive requests and information from various entities such as, for example, graphical user interfaces, command line interfaces, and any program applications that can send requests to and receive data from a database server.

According to the techniques described herein, spreadsheet logic 212 when executed is operable to generate and store XML views that can be used to access spreadsheet data in an XML spreadsheet format. For example, spreadsheet logic 212 may operable to examine SQL queries that define spreadsheet data that is stored in one or more relational tables. Examining the SQL queries that define spreadsheet data may include consulting one or more database dictionaries to determine any PK/FK key relationships that may have been defined for the one or more relational tables referenced in the SQL queries. Based on a SQL query and on the PK/FK key relationships of the relational table(s) referenced in the query, spreadsheet logic 212 is operable to generate an XQuery query which when executed returns the spreadsheet data in an XML spreadsheet format that is understood by the spreadsheet application.

According to the techniques described herein, spreadsheet logic 212 when executed is operable to generate, and store in database 202, XML views 206 that are defined by the XQuery queries generated by the logic. For example, in order to generate and store an XML view, spreadsheet logic 212 may automatically construct and execute a DDL statement (e.g., a SQL "CREATE VIEW" statement) that specifies an XQuery query.

According to the techniques described herein, spreadsheet logic 212 when executed is also operable to generate, and store in database 202, Instead-Of triggers 208 that are respectively associated with XML views 206. For example, as part of generating an XML view, spreadsheet logic 212 may automatically construct and execute a DDL statement (e.g., a SQL "CREATE TRIGGER" statement) that specifies an Instead-Of trigger for that XML view. An Instead-Of trigger associated with an XML view is executed by database server 210 in response to any data modification operation that is performed on that XML view. According to the techniques described herein, instead of performing a data modification operation on the XML view, the Instead-Of trigger performs one or more data modification operations on the one or more relational tables that are referenced in that XML view. In this manner, the techniques described herein provide a mechanism for modifying spreadsheet data that is stored in relational tables and that can be accessed through XML views defined over the relational tables.

According to the techniques described herein, a mapping may be generated in, or for access by, an Instead-Of trigger that is associated with an XML view. The mapping associates one or more cells specified in the XQuery that defines the XML view with one or more columns of the one or more relational tables that store the spreadsheet data defined in the XQuery query and accessible through the XML view. For example, in some embodiments the mapping may be a list that maps XML elements/cells in the XML spreadsheet format to rows/columns in the relational table(s) where the data for the XML elements/cells is stored. According to the techniques described herein, an Instead-Of trigger associated with a view may use the mapping to determine and generate DML statements that need to be performed against the rows/columns in the relational table(s) when operations to store modified spreadsheet data are performed against an XML view.

File protocol interface 214 is a set of database server components which, when executed, expose various database resources as files that can be accessed through various applications. An example of a file protocol interface 214 is a database server interface that implements the Web-based Distributed Authoring and Versioning (WebDAV) protocol, which is a set of extensions to the Hypertext Transfer Protocol (HTTP) that allow access to files managed on remote servers. The WebDAV protocol allows applications to create, access, modify, and move over HTTP files that are managed by remote servers. The WebDAV protocol is described in RFC 4819, which was published by the Internet Engineering Task Force (IETF) in June 2007.

According to the techniques described herein, after generating XML views that can provide spreadsheet data in XML spreadsheet format, spreadsheet logic 212 registers the XML views with file protocol interface 214. To register an XML view, file protocol interface 214 may store metadata information that associates the XML view with a filename that can be used by a spreadsheet application to reference a file. According to the techniques described herein, file protocol interface 214 is operable to register multiple database resources of multiple types; among these multiple database resources, file protocol interface 214 may register a plurality of XML views that provide access to a respective plurality of spreadsheet data that is defined over relational tables in one or more relational databases such as database 202.

As an operational example, suppose that file protocol interface 214 receives from spreadsheet application 200 a "File Open" command to open a particular file identified in the command by a filename. Based on the filename and/or on the file extension thereof, file protocol interface 214 examines the metadata information for the registered XML views, and determines which particular XML view, of the plurality of registered XML views, is associated with that filename. (If the filename received in the "File Open" command is not associated with any registered database resource, then file protocol interface 214 would return an error to spreadsheet application 200.) File protocol interface 214 then: translates the "File Open" command into a SQL "SELECT" statement that references the particular XML view associated with filename; executes or causes database server 210 to execute the SQL "SELECT" statement against the particular XML view; receives the results of the execution which would be the spreadsheet data in the XML spreadsheet format that can be accessed through the particular XML view; and returns the spreadsheet data in the XML spreadsheet format as a file to the spreadsheet application. In this manner, the techniques described herein provide to spreadsheet applications the ability to directly retrieve spreadsheet data that is stored in relational tables in databases managed by a database server.

As another operational example, suppose that file protocol interface 214 receives from spreadsheet application 200 a "File Save" command to save a particular file identified in the command by a filename. Based on the filename and/or on the file extension thereof, file protocol interface 214 examines the metadata information for the registered XML views, and determines which particular XML view, of the plurality of registered XML views, is associated with that filename. (If the filename received in the "File Save" command is not associated with any registered database resource, then file protocol interface 214 would return an error to spreadsheet application 200.) File protocol interface 214 then translates the "File Save" command into a SQL "UPDATE" statement that references the particular XML view associated with the filename, and executes or causes database server 210 to execute the SQL "UPDATE" statement against the particular XML view. In response to executing the SQL "UPDATE" statement against the particular XML view, the Instead-Of trigger associated with that XML view is fired and executed against the relational table(s) underlying that XML view. Based on a mapping between cells of the spreadsheet data and columns of the underlying relational table(s), the Instead-Of trigger determines the data modification operations that need to be performed on the XML view, translates these data modification operations into SQL "UPDATE", "INSERT", and/or SQL "DELETE" statements against the underlying relational table(s), and executes the SQL "UPDATE", "INSERT", and/or SQL "DELETE" statements to store in the underlying relational table(s) the changes to the spreadsheet data that are made by spreadsheet application 200. In this manner, the techniques described herein provide to spreadsheet applications the ability to directly modify spreadsheet data that is stored in relational tables in databases managed by a database server.

IV. Write-Protecting Cells in the XML Spreadsheet Format

FIG. 3A is a block diagram that illustrates spreadsheet data in an example XML spreadsheet format according to the techniques described herein.

Spreadsheet data 302 is formatted in a XML spreadsheet format, which comprises a set of tags 304 that define one or more rows for storing spreadsheet data values and a set of tags 306 that define one or more cells within the one or more rows. In some embodiments, the row tags and the cell tags may define the rows and cells, respectively, as XML elements that are part of an XML document that comprises a root node. An XML element defined by the row and cell tags may include one or more attributes such as, for example, an attribute that defines a data type for a spreadsheet cell corresponding to the XML element and an attribute that defines a formula associated with the cell corresponding to the XML element.

According to the techniques described herein, the XML spreadsheet format implemented in some embodiments may define for a row/cell an XML attribute that indicates that the spreadsheet data value stored in that row/cell cannot be modified. For example, in FIG. 3A, attribute 308 ("ss:Style='locked'") indicates that the cell associated with attribute 308 is to be rendered according an XSLT style that is defined by a spreadsheet application for write-protecting spreadsheet cells. A data value rendered in a locked, write-protected cell by a spreadsheet application cannot be modified by a user of the spreadsheet application. It is noted that various embodiments may use different types of XML attributes (e.g. style attributes or other application or format-specific attributes) to indicate write-protected cells in the spreadsheet data; thus, the example provided by attribute 308 in FIG. 3A is to be regarded in an illustrative rather than a restrictive sense.

By implementing an XML spreadsheet format with a mechanism for write-protecting cells, the techniques described herein allow for write-protecting spreadsheet data values that should not be modified because of referential integrity constraints and rules that are enforced by a database server on the relational tables that store the spreadsheet data.

For example, when a database server receives a SQL query (or other database command) that specifies spreadsheet data that is stored in one or more relational tables, the database server automatically examines one or more database dictionaries that store metadata information about the one or more relational tables. Based on the metadata information, the database server determines any primary keys and foreign keys that are defined for the one or more relational tables as well as any other referential integrity constraints, such as for example "NOT NULL" column constraints and user-defined column rules, that may be defined on columns of the one or more relational tables. The database server then determines which spreadsheet data values stored in the one or more relational tables may violate the determined keys, rules, and constraints when these data values are modified by a spreadsheet application. For example, the database server may determine that spreadsheet data values stored in a "NOT NULL" column of a relational table should not be allowed to be modified because a spreadsheet application may introduce a "NULL" value. In another example, the database server may determine that spreadsheet data values stored in a primary key and/or a foreign key columns of the relational tables should not be allowed to be modified because a spreadsheet application may introduce a spreadsheet data value that causes a primary key/foreign key data inconsistency (i.e., a data value that violates the PK/FK relationship defined for the one or more relational tables).

Thereafter, the database server generates an XML view defined by an XQuery query which when executed returns the spreadsheet data in an XML spreadsheet format, where the XML spreadsheet format provides in a locked, write-protected cell each of the spreadsheet data values that may violate any rules and constraints enforced by the database server. By providing spreadsheet data in an XML spreadsheet format with write-protected cells, the database server causes the spreadsheet application (which renders the spreadsheet data) to follow any referential integrity rules and constraints that are defined on the one or more relational tables that store the spreadsheet data while still allowing the spreadsheet application to modify any other spreadsheet data values that would not cause any referential integrity problems.

V. Data Modification Operations Against XML Views

According to the techniques described herein, a spreadsheet application retrieves spreadsheet data from an XML view that is exposed as a resource through a file protocol interface provided by a database server. When the spreadsheet application accesses the XML view, an XQuery query that defines the XML view is executed to return the spreadsheet data in an XML spreadsheet format that is understood and can be directly rendered by the spreadsheet application.

After the spreadsheet application renders the spreadsheet data, a user may modify the spreadsheet data through the spreadsheet application. For example, the user may change data values in the cells of the rendered spreadsheet and may add or delete rows of cells in the spreadsheet data. Thereafter, the user may save the modified spreadsheet data by invoking a "Save File" command through the spreadsheet application. When the "Save File" command is invoked, the spreadsheet application sends the command along with the modified spreadsheet data to the file protocol interface of the database server. The file protocol interface of the database server then examines the "Save File" command and determines in which particular XML view (of possibly a plurality of XML views) to store the modified spreadsheet data. The file protocol interface of the database server then converts the "File Save" command into one or more data modification commands that are executed against the XML view.

The techniques described herein are not limited to any particular data modification commands that the file protocol interface of the database server can execute against an XML view. For example, in some embodiments the file protocol interface may generate a data modification command that specifies an update operation that updates a value in a cell of the spreadsheet data that is specified by the XQuery query defining the XML view. In another example, the file protocol interface may generate a data modification command that specifies an insert operation that inserts a new row of cells in the spreadsheet data that is specified by the XQuery query defining the XML view. In yet another example, the file protocol interface may generate a data modification command that specifies a delete operation that deletes a row of cells from the spreadsheet data that is specified by the XQuery query defining the XML view.

It is noted that in some embodiments, the file protocol interface may generate an update command against the XML view, where the update command would cause an Instead-Of trigger associated with the XML view to be executed. Thereafter, the Instead-Of trigger would examine the modified spreadsheet data received from the spreadsheet application through the file protocol interface of the database server, and would determine exactly what data modification operations need to be performed against the XML view in order to store the modified spreadsheet data.

When the Instead-Of trigger associated with the XML view is executed, the Instead-Of trigger translates the data modification commands against the XML view into one or more DML statements against the one or more relational tables that store the spreadsheet data accessible through the XML view.

The one or more DML statements may include various operations against the one or more relational tables including, but not limited to, one or more SQL "UPDATE" operations, one or more SQL "INSERT" operations, and one or more SQL "DELETE" operations. For example, the Instead-Of trigger may examine a mapping that maps rows and cells in the spreadsheet data to rows and columns of the underlying relational tables, and may translate a data modification command which updates the value in a spreadsheet cell into a SQL "UPDATE" operation on a particular column of a particular relational table. In another example, the Instead-Of trigger may determine that the modified spreadsheet data includes a new row of cells; in this case, the Instead-Of trigger may translate the data modification command which inserts the new row of cells in the XML view into a SQL "INSERT" operation against the one or more relational tables that store the spreadsheet data. In another example, based on the mapping the Instead-Of trigger may determine that the modified spreadsheet data does not include a particular row of cells that was previously sent by the database server to the spreadsheet application; in this case, the Instead-Of trigger may translate the data modification command which deletes the particular row of cells from the XML view into a SQL "DELETE" operation against the one or more relational tables that store the spreadsheet data.

FIG. 3B is a block diagram that illustrates pseudo code for an XML view Instead-Of trigger according to one embodiment of the techniques described herein. Pseudo code 310 represents code for processing the modified spreadsheet data received from the spreadsheet application on a row-by-row basis. Block 312 represents code which when executed determines whether the row currently being processed is a new row of cells that has been newly added by the spreadsheet application. For example, the code may determine whether the row is newly added by comparing one or more key values from the row to the spreadsheet data currently existing in the underlying relational tables.

If the current row is newly added, then the code represented by block 314 when executed inserts the data values from the current row into the underlying relational tables. For example, the code may inspect a mapping to determine which cells of the modified spreadsheet data correspond to which columns in which underlying relational tables, and may then generate and execute one or more SQL "INSERT" statements against the one or more underlying relational tables.

If the current row is not newly added, then the code represented by block 316 when executed uses the data values from the current row to update the corresponding columns of the underlying relational tables. For example, block 318 represents code which when executed may inspect a mapping and may compare the data values in the current row of the modified spreadsheet data to the corresponding column values in the underlying relational tables. The code represented by block 320 when executed generates and executes one or more SQL "UPDATE" statements to update the corresponding columns of the one or more underlying relational tables with the data values in the current row of the modified spreadsheet data. In this manner, the Instead-Of trigger code represented by pseudo code 310 allows a spreadsheet application to directly update spreadsheet data that is stored in one or more relational tables managed by a database server.

VI. Operational Example in One Embodiment

Figure 4A:
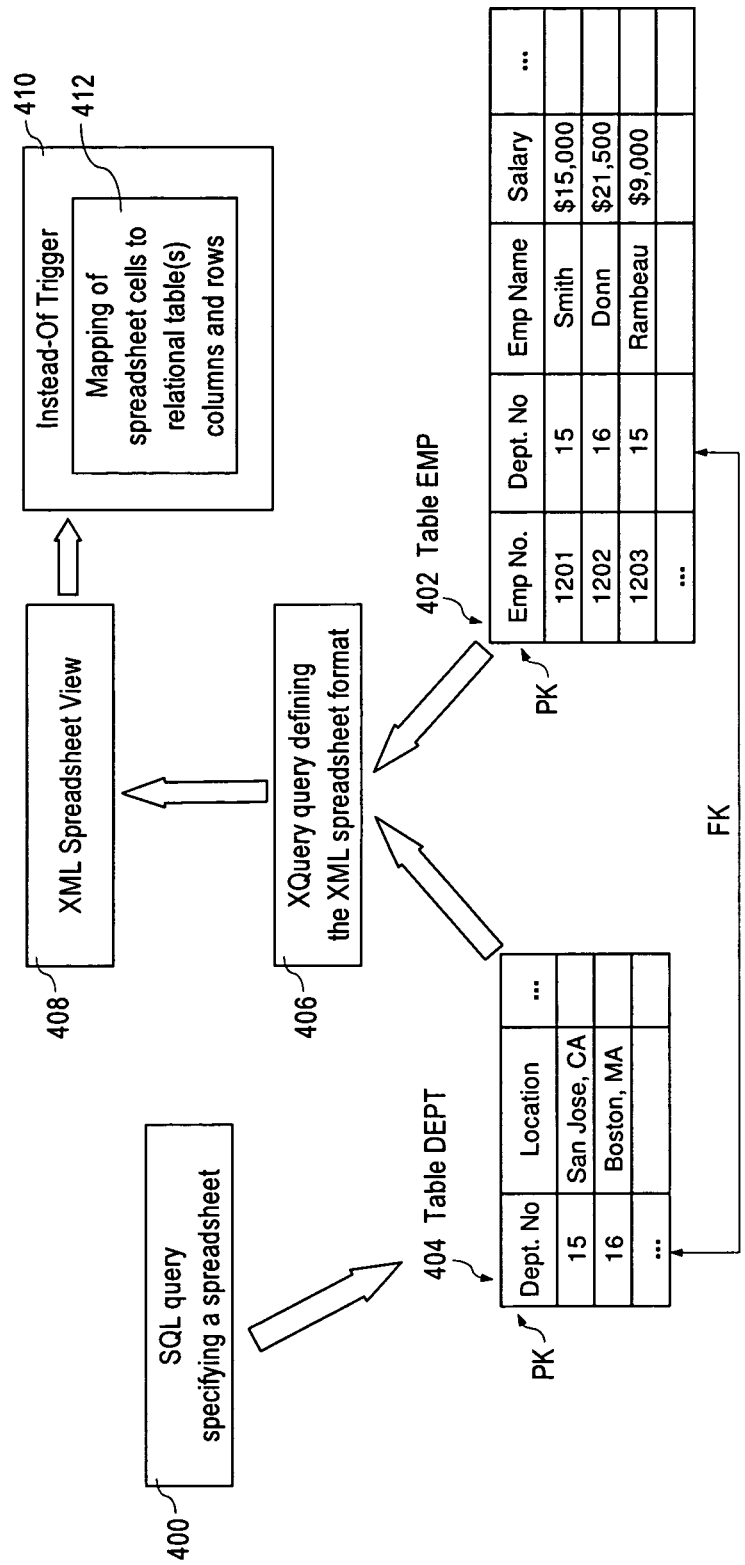
FIGS. 4A, 4B, and 4C are block diagrams illustrating an operational example of generating, accessing, and modifying spreadsheet data according to one embodiment.
Figure 4B:
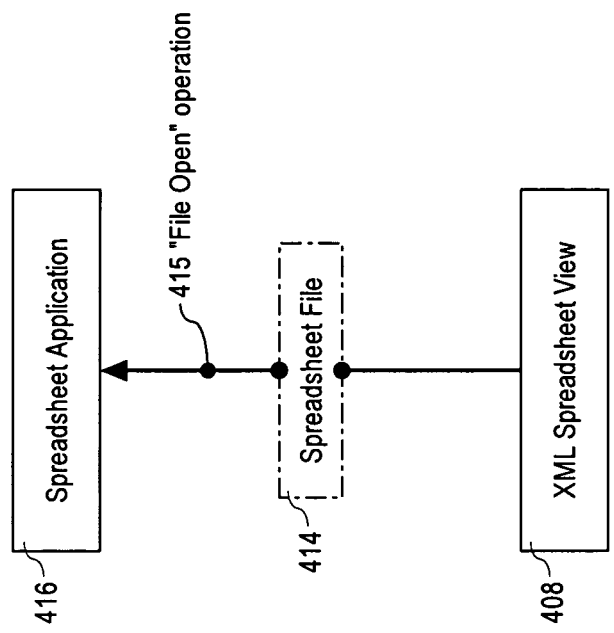
Figure 4C:
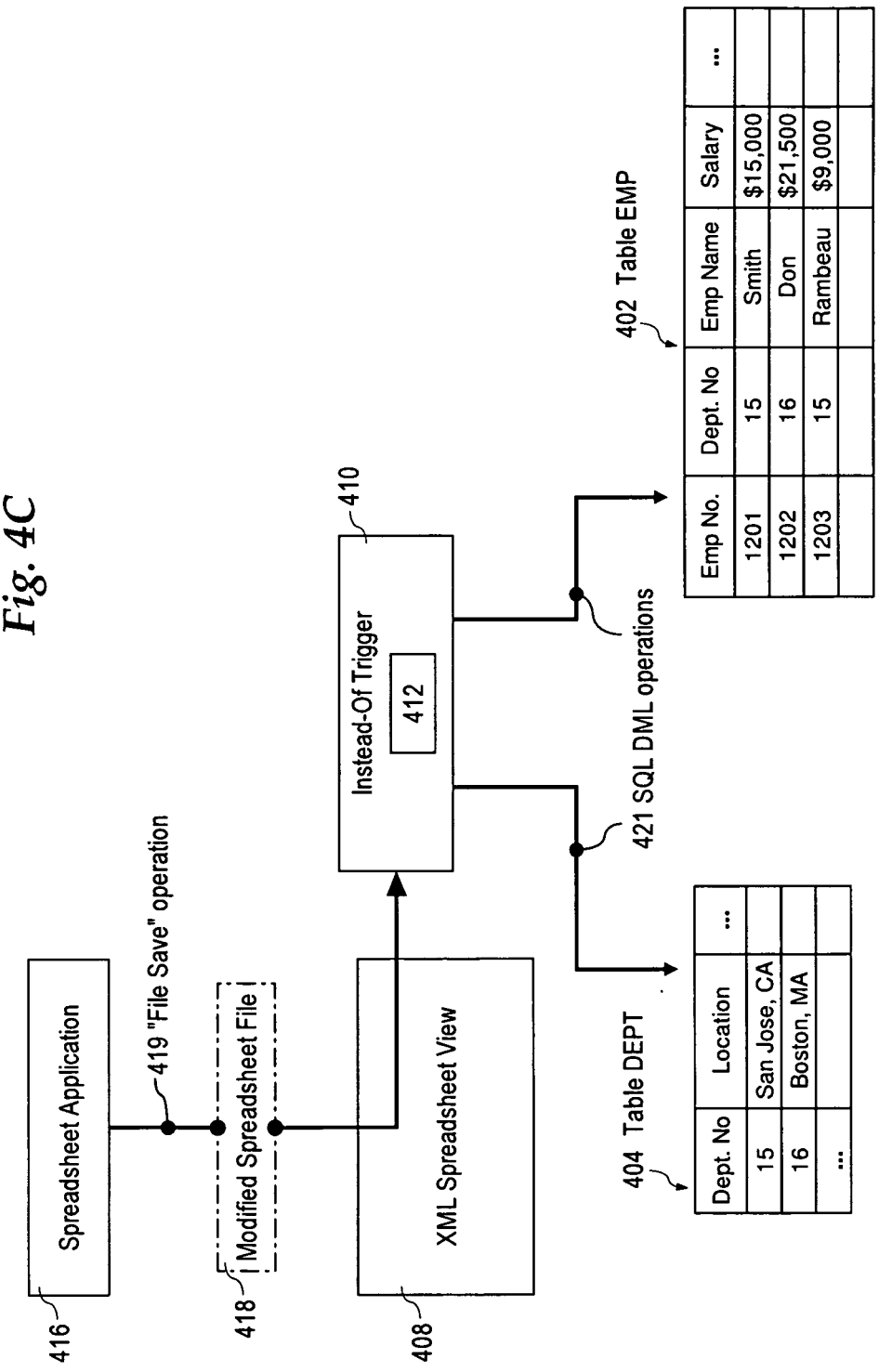

FIGS. 4A, 4B, and 4C are block diagrams illustrating an operational example of generating, accessing, and modifying spreadsheet data according to one embodiment.

Suppose that in an example operational context a user specifies, through an interface of a database server, the following a SQL query that specifies spreadsheet data:

```
Q1:  select e.empno, e.empname, d.location
     from   EMP e, DEPT d where e.salary > 10000
```

FIG. 4A is a block diagram illustrating, according to the techniques described herein, the generation of an XML view that can provide the specified spreadsheet data in an XML spreadsheet format that is understood by a spreadsheet application.

In FIG. 4A, the above SQL query "Q1" is received at database server as SQL query 400. The database server processes SQL query 400 against the relational tables 402 ("EMP") and 404 ("DEPT"), where tables 402 and 404 are relational tables that are managed by the database server in a relational database. As illustrated in FIG. 4A, table 402 "EMP" comprises columns "empno", "deptno", "empname", and "salary", where column "empno" is defined as the primary key for the table and column "deptno" is defined as a foreign key referencing column "deptno" in table 404 "DEPT". Table 404 "DEPT" comprises columns "deptno" and "location", where column "deptno" is defined as the primary key of the table.

After receiving SQL query 400, according to the techniques described herein the database server automatically discovers the PK/FK key relationships that are defined for tables 402 "EMP" and 404 "DEPT". For example, the database server may execute against a database dictionary the following query:

```
select a.table_name, b.table_name, c.column_name, d.column_name
from   user_constraints a, user_constraints b,
       user_cons_columns c, user_cons_columns d
where a.R_CONSTRAINT_NAME = b.CONSTRAINT_NAME
  and a.CONSTRAINT_NAME = c.CONSTRAINT_NAME
  and b.CONSTRAINT_NAME = d.CONSTRAINT_NAME
  and a.CONSTRAINT_TYPE = 'R'
  and a.table_name in ('EMP', 'DEPT')
  and b.table_name in ('EMP', 'DEPT')
  and a.table_name < > b.table_name
``` where "user_constraints" and "user_cons_columns" are tables in the database dictionary. The above query would return metadata information (for example, the set of values "EMP", "DEPT", "deptno", "deptno") that indicates that a PK/FK key relationship is defined between column "deptno" in table 404 "DEPT" and column "deptno" in table 402 "EMP".

Thereafter, according to the techniques described herein the database server translates the determined PK/FK key relationships into join conditions, and uses the join conditions to generate an XQuery query which when executed returns the spreadsheet data specified in SQL query 400 (the above query "Q1") in an XML spreadsheet format. For example, the following XQuery query 406 (XQuery query "Q2") may be generated:

```
Q2. {for   $EMP in ora:view("EMP")/ROW, $DEPT in
    ora:view("DEPT")/ROW
       where $EMP/DEPTNO/text( )=$DEPT/DEPTNO/text( ) and
       $EMP/SALARY > 10000
       return
         <ROW>
           <CELL ss:Style=1>{$EMP/EMPNO/text( )}</CELL >
```

```
           < CELL >{$EMP/EMPNAME/text( )}</CELL >
           < CELL >{$DEPT/LOCATION/text( )}</CELL >
         </ROW>}
``` where the tags "<ROW> . . . </ROW>" specify rows according to the XML spreadsheet format, and the tags "<CELL> . . . </CELL>" specify cells within the specified rows. It is noted that above XQuery query 406 returns all rows from table 402 "EMP" where the value in the "salary" column is greater than "10000". Further, in each returned row, the spreadsheet cell "{$EMP/EMPNO/text( )}" maps to column "empno" in table 402 "EMP", the spreadsheet cell "{$EMP/EMPNAME/text( )}" maps to column "empname" in table 402 "EMP", and spreadsheet cell "$DEPT/LOCATION/text( )" maps to column "location" in table 404 "DEPT". Finally, since the database server has determined that column "empno" is the primary key of table 402 "EMP", the XML spreadsheet format specified in XQuery query 406 specifies the style "ss:Style=1" in the spreadsheet cell "{$EMP/EMPNAME/text( )}", which indicates that the values returned by the XQuery query in that cell are write-protected so that a spreadsheet application would not be able to modify them.

Thereafter, the database server generates XML view 408 that is defined by the XQuery query 406. For example, the database server may generate the following DDL statement:

```
CREATE VIEW "xmlEMPS" OF XMLTYPE AS
select xmlroot (xmlconcat (xmlpi("application",
'progid="Application.Sheet"'),
    (<ss:Workbook xmlns:o="urn:schemas-spreadsheet-
    application:application"
       xmlns:ss="urn:schemas-spreadsheet-
       appication:application:spreadsheet"
       xmlns:html="http://www.w3.org/TR/REC-html40">),
    ({for    $EMP in ora:view("EMP")/ROW, $DEPT in
    ora:view("DEPT")/ROW
       where $EMP/DEPTNO/text( )=$DEPT/DEPTNO/text( ) and
       $EMP/SALARY > 10000
       return
         <ROW>
           <CELL ss:Style=1>{$EMP/EMPNO/text( )}</CELL >
           < CELL >{$EMP/EMPNAME/text( )}</CELL >
           < CELL >{$DEPT/LOCATION/text( )}</CELL >
         </ROW>} returning content ),
      VERSION 1.0)
from sys.dual
```

The above DDL statement when executed generates and stores XML view 408 (named "xmlEMPS"), which specifies an XML spreadsheet format that is understood by a spreadsheet application such as Microsoft® Excel or Open Office Calc. (The table "sys.dual" specified in the above DDL statement is a system table comprising of exactly one row that has exactly one column.)

According to the techniques described herein, when the database server generates XML view 408, the database server also registers the XML view with a file protocol interface of the database server. The file protocol interface is operable to expose as a file the data that can be accessed through XML view 408. The file protocol interface may register XML view 408 by associating it with a filename, such as for example "xmlEMPS.xls".

When the database server generates the XML view 408, according to the techniques described herein the database server also generates Instead-Of trigger 410 that is associated with XML view 408. Instead-Of trigger 410 is executed automatically by the database server in response to any update operation that is executed against XML view 408. Instead-Of trigger 410 includes a mapping 412, which maps the cells specified in XQuery query 406 that defines XML view 408 to columns of tables 402 "EMP" and 404 "DEPT. For example, the spreadsheet cell "{$EMP/EMPNO/text( )" specified in XQuery query 406 maps to column "empno" in table 402 "EMP", the spreadsheet cell "{$EMP/EMPNAME/text( )" specified in XQuery query 406 maps to column "empname" in table 402 "EMP", and spreadsheet cell "$DEPT/LOCATION/text( )" specified in XQuery query 406 maps to column "location" in table 404 "DEPT". Instead-Of trigger 410 uses mapping 412 to determine which columns in tables 402 "EMP" and 404 "DEPT" need to be updated in response to any updates to the corresponding spreadsheet cells that may be made by a spreadsheet application.

FIG. 4B is a block diagram illustrating, according to the techniques described herein, how a spreadsheet application can directly retrieve from the database server the spreadsheet data specified by XQuery query 406 that defines XML view 408.

Suppose that spreadsheet application 416 sends command 415 ("File Open xmlEMPS.xls") to the file protocol interface of the database server. The file protocol interface of the database server uses the filename ("xmlEMPS.xls") provided in command 415 to determine which XML view, of a plurality of registered XML views, is referenced in command 415. Thus, the file protocol interface of the database server determines that spreadsheet application 416 is referencing data accessible through XML view "xmlEMPS". Based on the command identifier (e.g., "File Open") of command 415, the file protocol interface of the database server determines that spreadsheet application 416 wants to open the spreadsheet data accessible through XML view "xmlEMPS". Thereafter, the file protocol interface of the database server translates the "File Open xmlEMPS.xls" command to a DML statement which when executed can retrieve the requested spreadsheet data from the XML view "xmlEMPS". The translated DML statement may be for example:

select*from xmlEPMS

The file protocol interface of the database server then executes the above DML statement to retrieve the requested spreadsheet data. With reference to the data stored in tables 402 "EMP" and 404 "DEPT" in FIG. 4A, portions of the retrieved spreadsheet data are illustrated in Table 1 below:

TABLE 1

XML Spreadsheet Data Returned from XML View "xmlEMPS"

<xsl:pi name="application" progid="Application.Sheet"
  ss:Workbook xmlns:o="urn:schemas-spreadsheet-application:application"
  xmlns:ss="urn:schemas-spreadsheet-appication:application:spreadsheet"
  xmlns:html="http://www.w3.org/TR/REC-html40"> VERSION="1.0"
</xsl:pi>
<ROW>
 <CELL ss:Style=1>1201</CELL>
 <CELL>Smith</CELL>
 <CELL>San Jose, CA</CELL>
</ROW>
<ROW>
 <CELL ss:Style=1>1202</CELL>
 <CELL>Donn</CELL>
 <CELL>Boston, MA</CELL>
</ROW>
...

As illustrated in Table 1, the returned spreadsheet data is formatted in an XML spreadsheet format that is understood by spreadsheet application 416.

When the file protocol interface of the database server retrieves the spreadsheet data from XML view "xmlEMPS", the file protocol interface converts the retrieved spreadsheet data into spreadsheet file 414. The file protocol interface of the database server then provides spreadsheet file 414 to spreadsheet application 416, and the spreadsheet application renders the spreadsheet data from the file. In this manner, the techniques for accessing spreadsheet data through an XML view described herein are completely transparent from the perspective of spreadsheet application 416. For example, the spreadsheet application sends a request for, and receives, spreadsheet file 414 without knowing that the spreadsheet data is actually stored in relational database tables managed by the database server and without needing to do anything outside of performing its normal operations for opening a file.

FIG. 4C is a block diagram illustrating, according to the techniques described herein, how a spreadsheet application can directly update spreadsheet data that is specified by XQuery query 406 that defines XML view 408.

Suppose that spreadsheet application 416 sends command 419 ("File Save xmlEMPS.xls") to the file protocol interface of the database server. Spreadsheet application 416 also provides to the file protocol interface of the database server file 418 (e.g., the file "xmlEMPS.xls" referenced in command 419), which includes modified spreadsheet data that has been changed by spreadsheet application 416. Suppose that the modified spreadsheet data provided in file 418 includes the change of the name of the employee with employee number 1202 from "Donn" to "Don". The modified spreadsheet data with this change is illustrated in Table 2 below:

TABLE 2

Modified XML Spreadsheet Data Provided in File 418

<xsl:pi name="mso-application" progid="Excel.Sheet"
  ss:Workbook xmlns:o="urn:schemas-spreadsheet-application:application"
  xmlns:ss="urn:schemas-spreadsheet-appication:application:spreadsheet"
  xmlns:html="http://www.w3.org/TR/REC-html40"> VERSION="1.0"
</xsl:pi>
...
<ROW>
 <CELL ss:Style=1>1202</CELL>
 <CELL>Don</CELL>
 <CELL>Boston, MA</CELL>
</ROW>
...

As illustrated in Table 2, the modified spreadsheet data is formatted in an XML spreadsheet format that is understood by the file protocol interface of the database server.

The file protocol interface of the database server uses the filename ("xmlEMPS.xls") of file 418 to determine which XML view, of a plurality of registered XML views, is referenced in command 419. Thus, the file protocol interface of the database server determines that spreadsheet application 416 is referencing data accessible through XML view 408 (the XML view named "xmlEMPS"). Based on the command identifier (e.g., "File Save") of command 419, the file protocol interface of the database server determines that spreadsheet application 416 wants to store the spreadsheet data of file 418 into XML view 408. Thereafter, the file protocol interface of the database server translates the "File Save xmlEMPS.xls" command to a DML statement which when executed can store the spreadsheet data of file 418 into XML view 408. The translated DML statement may be for example:

update xmlEMPS with xmlEMPS.xls

The file protocol interface of the database server then executes the above DML statement to store the modified spreadsheet data of file 418 into XML view 408. In response to executing the DML statement against XML view 408, Instead-Of trigger 410 is fired and executed. When executed, Instead-Of trigger 410 processes the modified spreadsheet data in file 418 row-by-row and determines, based on mapping 412, exactly which columns in exactly which rows of tables 402 "EMP" and/or 404 "DEPT" need to be updated. For example, during this processing Instead-Of trigger 410 would determine that the employee name of the employee with employee number "1202" needs to be changed to "Don". Instead-Of trigger 410 then generates SQL DML statement 421, which includes a SQL "UPDATE" operation against table 402 "EMP" in order to store the changed employee name. For example, Instead-Of trigger 410 may generate the following SQL DML statement:

```
update EMP
set empname = 'Don'
where empno = 1202
```

Instead-Of trigger 410 then executes this SQL DML statement in order to store the changed employee name into table 402 "EMP". (It is noted that if the modified spreadsheet data provided in file 418 includes any other changes, Instead-Of trigger 410 would generate corresponding SQL DML statements in a similar manner in order to store the changed data in the corresponding tables.)

In this manner, the techniques for modifying spreadsheet data through an XML view described herein are completely transparent from the perspective of spreadsheet application 416. For example, spreadsheet application 416 saves the spreadsheet data of file 418 without knowing that the spreadsheet data is actually stored in relational database tables managed by the database server and without needing to do anything outside of performing its normal operations for saving a file.

VII. Hardware Overview

Figure 5:
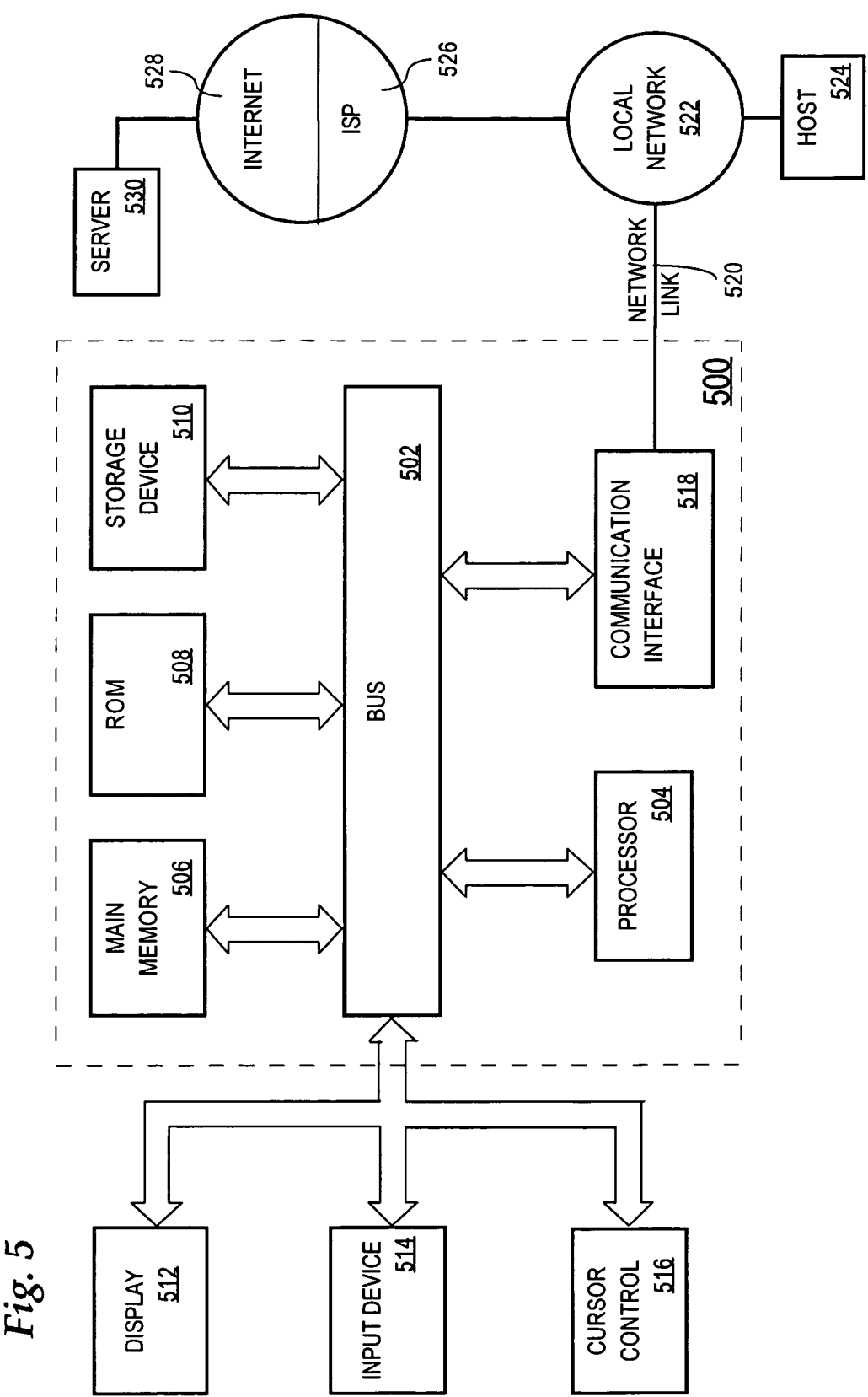
FIG. 5 is a block diagram that illustrates a computer system upon which an embodiment may be implemented.

FIG. 5 is a block diagram that illustrates a computer system 500 upon which an embodiment may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a machine to operate in a specific fashion. In an embodiment implemented using computer system 500, various computer-readable media are involved, for example, in providing instructions to processor 504 for execution. Such a medium may take many forms, including but not limited to storage media and transmission media. Storage media includes both non-volatile media and volatile media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine such as, for example, computer system 500.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
   at a database server, receiving a request from a spreadsheet application to open a spreadsheet file, wherein the request includes a filename for the file;
   wherein spreadsheet data is stored in one or more relational tables in one or more relational databases that are managed by the database server;
   in response to receiving said request to open a spreadsheet file:
      the database server retrieving spreadsheet data via an eXtensible Markup Language (XML) view that is defined by a particular query;
      the database server converting said spreadsheet data retrieved via the XML view into said spreadsheet file;
      the database server providing the spreadsheet file directly to the spreadsheet application;
   wherein the method is performed by one or more computer systems.

2. The method of claim 1, further comprising:
   prior to receiving the request from the spreadsheet application, the database server creating the XML view, wherein creating the XML view comprises the steps of:
      the database server receiving a Structured Query Language (SQL) query, wherein the SQL query specifies the one or more relational tables;
      the database server automatically determining one or more key relationships that are defined for the one or more relational tables;
      the database server automatically generating the particular query based on the SQL query and on the one or more key relationships, wherein the particular query specifies an XML spreadsheet format that is understood by the spreadsheet application; and
      the database server automatically generating and storing the XML view that is defined by the particular query.

3. The method of claim 2, further comprising the database server automatically generating and storing a set of code that is associated with the XML view, wherein:
   the set of code is executed by the database server in response to any data modification operation that is performed on the XML view; and
   instead of performing a data modification operation on the XML view, the set of code is operable to perform one or more operations against the one or more relational tables.

4. The method of claim 3, further comprising:
   the database server automatically generating and storing a mapping that associates one or more cells specified in the particular query with one or more columns of the one or more relational tables that store the spreadsheet data;
   wherein the set of code is operable to convert, based on the mapping, the data modification operation into the one or more operations against the one or more relational tables.

5. The method of claim 3, further comprising:
   at the database server, receiving a second request from the spreadsheet application to save a second modified spreadsheet file, wherein the second modified spreadsheet file includes changes made by the spreadsheet application to the spreadsheet file provided by the database server; and
   the database server storing modified spreadsheet data included in the modified spreadsheet file in the one or more relational tables, wherein storing the modified spreadsheet data comprises:
      the database server determining that one or more data modification operations need to be performed on the XML view; and
      the database server automatically executing the set of code instead of performing the one or more data modification operations, wherein executing the set of code comprises:
         converting the one or more data modification operations into one or more respective sets of operations against the one or more relational tables; and
         executing the one or more sets of operations in order to store the modified spreadsheet data into the one or more relational tables.

6. The method of claim 5, wherein the one or more data modification operations that need to be performed on the XML view include at least one of:
   an update operation that updates a value in a cell of the spreadsheet data that is specified by the particular query that defines the XML view;

an insert operation that inserts a row of cells in the spreadsheet data that is specified by the particular query that defines the XML view; and a delete operation that deletes a row of cells from the spreadsheet data that is specified by the particular query that defines the XML view.

7. The method of claim 5, wherein the one or more sets of operations against the one or more relational tables include at least one of:
a SQL UPDATE operation;
a SQL INSERT operation; and
a SQL DELETE operation.

8. The method of claim 2, wherein the database server automatically generating the particular query further comprises:
based on the one or more key relationships, automatically determining that one or more cells defined in the XML spreadsheet format are not allowed to be modified; and
inserting, in the XML spreadsheet format specified in the particular query, attribute data in association with each cell of the one or more cells, wherein the attribute data indicates that said each cell cannot be modified.

9. The method of claim 8, wherein the spreadsheet file provided by the database server stores the attribute data in association with each cell of the one or more cells.

10. The method of claim 8, wherein the attribute data is an XML attribute that identifies a style that is defined by the spreadsheet application for write-protecting cells.

11. The method of claim 8, wherein the database server automatically determining the one or more key relationships comprises automatically examining one or more database dictionaries respectively associated with the one or more relational databases to determine one or more of:
one or more primary keys that are defined for at least one of the one or more relational tables; and
one or more foreign keys that are defined for at least one of the one more relational tables.

12. The method of claim 1, wherein the particular query is an XML Query Language (XQuery) query, and wherein an XML spreadsheet format specified in the XQuery query includes:
first set of tags defining one or more rows for storing the spreadsheet data; and
second set of tags defining one or more cells within the one or more rows.

13. The method of claim 1, further comprising the database server registering the XML view as a resource that is provided by the database server through a file access protocol operable to facilitate access to database resources in file format.

14. A non-transitory computer-readable storage medium storing one or more sequences of instructions which, when executed by one or more processors, cause:
at a database server, receiving a request from a spreadsheet application to open a spreadsheet file, wherein the request includes a filename for the file;
wherein spreadsheet data is stored in one or more relational tables in one or more relational databases that are managed by the database server;
in response to receiving said request to open a spreadsheet file:
the database server retrieving spreadsheet data via an eXtensible Markup Language (XML) view that is defined by a query;
the database server converting said spreadsheet data retrieved via the XML view into said spreadsheet file;
the database server providing the spreadsheet file directly to the spreadsheet application.

15. The computer-readable storage medium of claim 14, wherein the one or more sequences of instructions further comprise instructions which, when executed by the one or more processors, cause:
prior to receiving the request from the spreadsheet application, the database server creating the XML view, wherein creating the XML view comprises the steps of:
the database server receiving a Structured Query Language (SQL) query, wherein the SQL query specifies the one or more relational tables;
the database server automatically determining one or more key relationships that are defined for the one or more relational tables;
the database server automatically generating the particular query based on the SQL query and on the one or more key relationships, wherein the particular query specifies an XML spreadsheet format that is understood by the spreadsheet application; and
the database server automatically generating and storing the XML view that is defined by the particular query.

16. The computer-readable storage medium of claim 15, wherein the one or more sequences of instructions further comprise instructions which, when executed by the one or more processors, cause the database server automatically generating and storing a set of code that is associated with the XML view, wherein:
the set of code is executed by the database server in response to any data modification operation that is performed on the XML view; and
instead of performing a data modification operation on the XML view, the set of code is operable to perform one or more operations against the one or more relational tables.

17. The computer-readable storage medium of claim 16, wherein the one or more sequences of instructions further comprise instructions which, when executed by the one or more processors, cause:
the database server automatically generating and storing a mapping that associates one or more cells specified in the particular query with one or more columns of the one or more relational tables that store the spreadsheet data;
wherein the set of code is operable to convert, based on the mapping, the data modification operation into the one or more operations against the one or more relational tables.

18. The computer-readable storage medium of claim 16, wherein the one or more sequences of instructions further comprise instructions which, when executed by the one or more processors, cause:
at the database server, receiving a second request from the spreadsheet application to save a second modified spreadsheet file, wherein the modified spreadsheet file includes changes made by the spreadsheet application to the spreadsheet file provided by the database server; and
the database server storing modified spreadsheet data included in the modified spreadsheet file in the one or more relational tables, wherein storing the modified spreadsheet data comprises:
the database server determining that one or more data modification operations need to be performed on the XML view; and
the database server automatically executing the set of code instead of performing the one or more data modification operations, wherein executing the set of code comprises:

converting the one or more data modification operations into one or more respective sets of operations against the one or more relational tables; and executing the one or more sets of operations in order to store the modified spreadsheet data into the one or more relational tables.

19. The computer-readable storage medium of claim 18, wherein the one or more data modification operations that need to be performed on the XML view include at least one of:

an update operation that updates a value in a cell of the spreadsheet data that is specified by the particular query that defines the XML view;

an insert operation that inserts a row of cells in the spreadsheet data that is specified by the particular query that defines the XML view; and a delete operation that deletes a row of cells from the spreadsheet data that is specified by the particular query that defines the XML view.

20. The computer-readable storage medium of claim 18, wherein the one or more sets of operations against the one or more relational tables include at least one of:

a SQL UPDATE operation;

a SQL INSERT operation; and a SQL DELETE operation.

21. The computer-readable storage medium of claim 15, wherein the instructions that cause the database server automatically generating the particular query further comprise instructions which, when executed by the one or more processors, cause:

based on the one or more key relationships, automatically determining that one or more cells defined in the XML spreadsheet format are not allowed to be modified; and inserting, in the XML spreadsheet format specified in the particular query, attribute data in association with each cell of the one or more cells, wherein the attribute data indicates that said each cell cannot be modified.

22. The computer-readable storage medium of claim 21, wherein said spreadsheet file provided by the database server stores the attribute data in association with each cell of the one or more cells.

23. The computer-readable storage medium of claim 21, wherein the attribute data is an XML attribute that identifies a style that is defined by the spreadsheet application for write-protecting cells.

24. The computer-readable storage medium of claim 21, wherein the instructions that cause the database server automatically determining the one or more key relationships further comprise instructions which, when executed by the one or more processors, cause automatically examining one or more database dictionaries respectively associated with the one or more relational databases to determine one or more of:

one or more primary keys that are defined for at least one of the one or more relational tables; and one or more foreign keys that are defined for at least one of the one more relational tables.

25. The computer-readable storage medium of claim 14, wherein the particular query is an XML Query Language (XQuery) query, and wherein an XML spreadsheet format specified in the XQuery query includes:

first set of tags defining one or more rows for storing the spreadsheet data; and second set of tags defining one or more cells within the one or more rows.

26. The computer-readable storage medium of claim 14, wherein the one or more sequences of instructions further comprise instructions which, when executed by the one or more processors, cause the database server registering the XML view as a resource that is provided by the database server through a file access protocol operable to facilitate access to database resources in file format.

\* \* \* \* \*